March 18, 1958  H. H. ALLEN  2,826,817
METHOD AND APPARATUS FOR MEASURING THICKNESS
Filed Feb. 7, 1955

H. H. ALLEN
INVENTOR

ATTORNEYS

United States Patent Office 2,826,817
Patented Mar. 18, 1958

2,826,817

METHOD AND APPARATUS FOR MEASURING THICKNESS

Henry Hans Allen, London, England, assignor to British Celanese Limited, a corporation of Great Britain Application February 7, 1955, Serial No. 486,629

Claims priority, application Great Britain February 12, 1954

11 Claims. (Cl. 33—147)

The invention concerns a method and apparatus for measuring thickness and particularly for measuring and recording the point-to-point variations in the thickness of a sheet or strip of flexible material, for example, a plastic film.

The thickness of the film is measured by a stationary thickness gauge, having a movable foot, as the distance between the foot of the gauge and a stationary surface (or anvil) supporting the film as the latter passes through the measuring gap between the foot of the gauge and the anvil, the foot being urged towards the anvil so as to keep the film in contact with the anvil. The thickness is recorded on a strip of material which is advanced so that its motion is related to the motion of the flexible film. In practice, it is found preferable to move the film intermittently and to record the thickness at discrete points only, allowing the gauge to steady while the film is not moving. If the film is moved continuously, the pointer of the gauge tends to oscillate owing to the movement and to thickness variations of the film, especially if the thickness variations are relatively large and the gauge is sensitive. The readings of the gauge, while the pointer is oscillating in this way, bear little relationship to the true thickness of the film. Preferably also the strip of recording material on which the displacement of the foot from the anvil is recorded is moved intermittently in such a way that the strip is at rest when the thickness is recorded. The anvil and thickness gauge should be rigidly supported relative to each other so as to obtain a high degree of accuracy. Preferably the film is advanced over a curved surface of the anvil and then through the measuring gap between the foot of the gauge and a flat surface of the anvil, after which it is again advanced over a curved surface of the anvil.

Variations in the thickness of the film may be recorded by a suitable stylus, e. g. a pen with a supply of ink, the stylus being secured to the pointer of the dial and touching a moving chart. Preferably, the chart is only intermittently brought into contact with the stylus so as to record the position of the pointer each time it takes up a steady reading. Not only does this avoid recording irrelevant oscillations of the pointer between the points at which a record of the thickness is desired, but it avoids frictional drag of the paper on the point of the stylus and the resulting possibility of false readings of the stylus at the end of the oscillations. The chart is preferably brought into contact with the stylus at a time when it is not being advanced.

The chart drive may be geared to the film drive in such a way that the chart and film advance by steps of the same length. The variations in thickness along the length of the film can then be identified by juxtaposing the film and the chart. Since the pen point moves along the arc of a circle and not in a straight line, the marks made by the recording pen are longitudinally displaced from the appropriate parts of the film. Comparison of the film and chart will therefore be facilitated if the chart has ruled lines corresponding to the arc described by the point of the pen, or if a template with an arcuate edge is used.

If the chart is not required for direct comparison with the film, the chart and film drive may be geared together in such a way that the chart travels at a different speed from that of the film. Preferably, the chart travels at as slow a speed as is possible consistent with maintaining enough spacing between the marks on the chart for the marks to be individually readable.

An alternative method of recording the thickness of the film is to attach a mirror to the dial pointer so that it reflects light from a source on to a scale or a photographic film. If desired, the photographic film may be intermittently masked from the light so as to record only the steady readings of the pointer. Alternatively, if desired, the readings of the pointer may be recorded on a magnetic strip.

If the film is of such material as to be liable to accumulate a charge of static electricity, inaccuracies may result due to the attraction of dust particles to the film and the presence of these dust particles in the measuring gap. This source of error can be reduced by running the film past a de-electricifying device, e. g. a radioactive bar, and by removing dust particles from the neighbourhood of the measuring gap, e. g. by setting up a current of air with a fan.

The process of the invention is particularly suited for examining the variations in thickness of a melt- or solvent-extruded film. By way of example, an apparatus in accordance with the invention for measuring and recording the thickness of a 2" test strip cut across the width of an extruded film is described below in greater detail with reference to the accompanying drawings in which.

Figure 1:
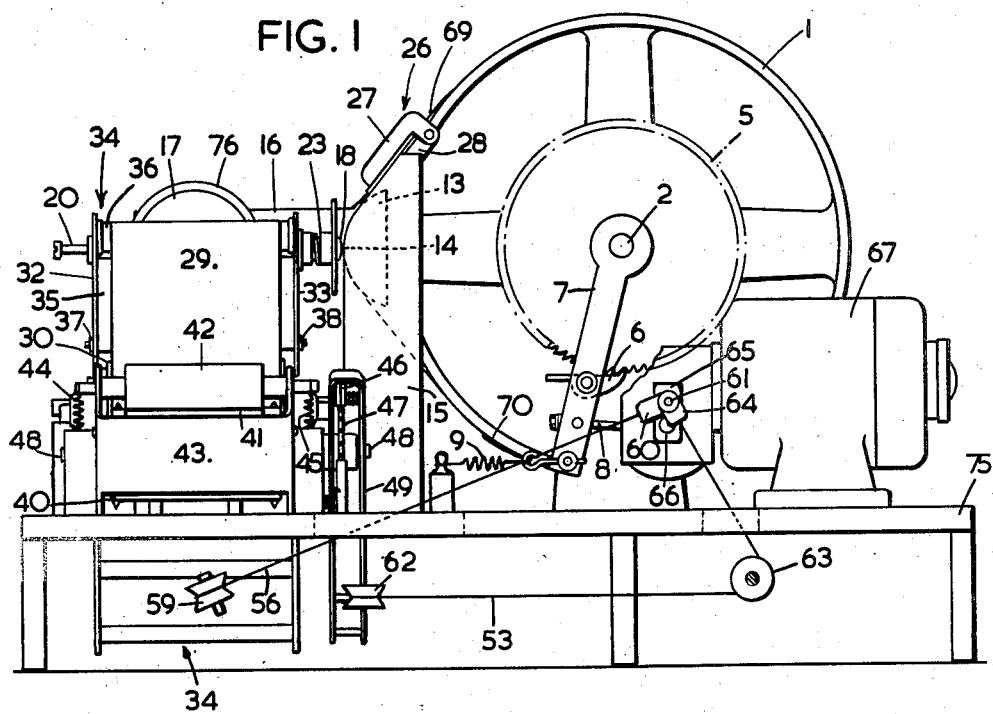
Fig. 1 is an elevation of an apparatus in accordance with the invention.
Figure 2:
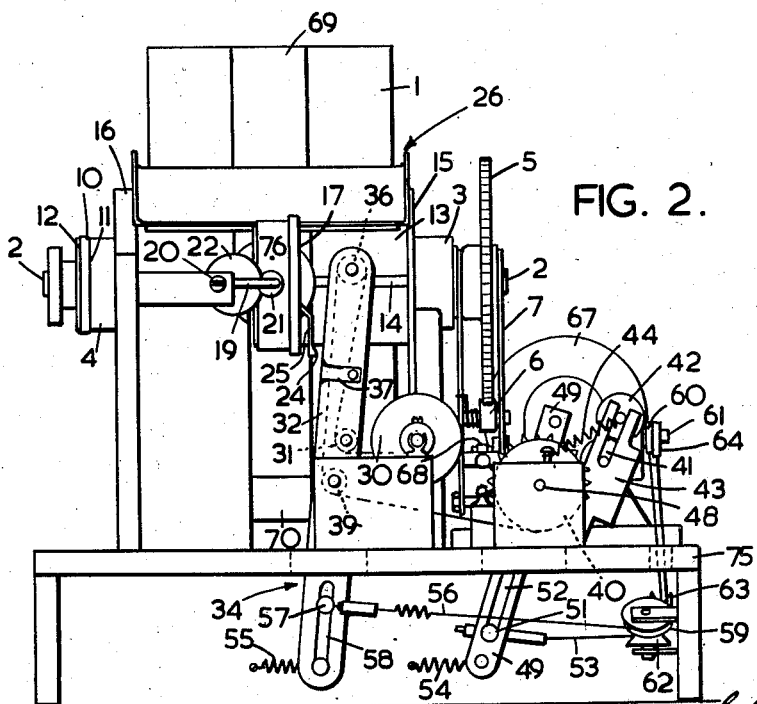
Fig. 2 is an elevation of the same apparatus viewed from a different angle.

A steel drum 1, of 8" diameter and 4" axial length, is supported by a horizontal spindle 2, which is rotatably mounted in members 3 and 4 bolted to the base plate 75. A toothed ratchet wheel 5 is attached to the spindle 2, the teeth of the ratchet wheel 5 being engaged by a pawl 6 mounted on an arm 7 which oscillates about the spindle 2. The motion of the arm 7 about the spindle 2 is effected by a connecting rod 8 acting through a spring 9. A felt washer 10 bears against a surface 11 of the member 4 and a surface 12 formed integrally with the spindle 2, and acts as a brake to prevent the drum from continuing to rotate after the positive pressure between the pawl 6 and the ratchet teeth on the wheel 5 has ceased. Each point on the surface of the drum 1 is advanced ¼" for every complete cycle of oscillation of the arm 7. For the major part of each cycle, the drum 1 is at rest.

A stationary anvil 13, extending parallel to the axis of the drum 1 is placed a short distance from the curved surface of the drum on substantially the same level as the spindle 2. Substantially all of the side of the anvil 13 further from the drum is convexly curved but the furthest part of this side is ground to a flat 14 $\frac{1}{16}$" wide. The anvil 13 is rigidly supported on one side by a member 15 and on the other side by a member 16 both bolted to the base-plate 75. The member 16 also rigidly holds a Mercer low tension dial gauge 76 reading to 0.0001", so that the dial face 17 is substantially vertical and the foot 18 of the gauge projects horizontally towards the flat 14 on the surface of the anvil 13. A spring 19 with an adjusting nut 20 is placed so that it can bear against a button 21 attached to the stem of the dial gauge and can, if required, assist the spring fitted in the stem of the gauge to keep the foot 18 pressed towards the anvil 13. The stem of the dial gauge may be retracted by hand so as to remove the foot 18 from the anvil 13. The stem can be maintained in the retracted position by means of a disc 22, the thickness of which varies about its circumference, the disc being rotated when required for this purpose until a relatively thick portion of its edge is positioned behind the button 21. A micrometer adjustment 23 is incorporated in the gauge foot 18 for positioning the foot relatively to the anvil 13. A recording pen 24 is mounted on the lower end of an arm 25, which is attached at its upper end to the spindle of the dial pointer and is secured so that it rotates with the pointer and is vertical when the pointer is at zero.

A de-electrifying device indicated generally as 26 is mounted on the members 15 and 16, in a position just above the anvil. The de-electrifying device 26 consists of two hinged members 27 and 28 carrying co-operating pads impregnated with a de-electrifying solution. The film passes between these two pads immediately before entering the measuring gap between the foot 18 and the flat 14 of the anvil.

A chart 29 in the form of a strip of paper passes from a braked supply reel 30 under a freely rotating roll 31 the spindle of which is mounted on the side-arms 32 and 33 of a lever-member indicated generally as 34. The chart then passes up behind a plate 35 extending between the arms 32 and 33, over a freely rotating roll 36 at the top of the lever-member 34, down between the front of the plate 35 and a pair of guides 37 and 38 which are mounted on the side-arms 32 and 33 respectively, and hold the paper against the front of the plate 35. From the plate 35, the paper passes under a freely rotating roll 39 at the pivot point of the lever-member 34, under a driven reel 40, which is a sprocket reel carrying teeth engaging in perforations at either side of the paper, over a blotting roll 41 against which it is nipped by a pressure roll 42, and thence away from the apparatus for storage or examination. The rolls 41 and 42 are both rotatably supported by the arms of a member 43. Springs 44 and 45 are attached to the spindle of the pressure roll 42 so as to maintain the rolls 41 and 42 in contact with each other and maintain the blotting roll 41 in driving contact with the driven braked reel 40. The driven reel 40 is advanced by the action of a pawl 46 which engages with the teeth of a ratchet wheel 47 mounted on the spindle 48 carrying the driven reel 40. The pawl 46 is mounted on an arm 49 pivoted on the spindle 48, and is a split pawl so as to give a half-tooth movement which can be put out of action by removing or locking one part of the pawl. The other end of the arm 49 is connected by a pin 51 engaged in a slot 52 in the arm 49 to a pull-cord 53 which, together with the spring 54, acts on the arm 49 so as to give the pawl 46 a reciprocating motion. By altering the position of the pin 51 in the slot 52 the angle through which the arm 49 moves may be varied. This will vary the distance the pawl 46 moves and thus the distance the chart 29 advances each time the pull-cord 53 is operated. By adjusting the position of the pin 51 in the slot 52 and by using the half-tooth movement if necessary, the distance the chart 29 moves may be varied from 1/16" to 3/8" for every 1/4" movement of the surface of the drum 1.

The chart 29 is normally out of contact with the point of the recording pen 24, but is moved into such contact by the periodic angular shifting of the lever-member 34 which is spring-loaded by the spring 55 against the tension in a pull-cord 56. The point of pull of the pull-cord 56 may be adjusted as in the case of the arm 49 by adjusting the position of a pin 57 in a slot 58. The pull-cord 56 passes round a pulley 59 to a connector 60 embracing a crank pin 61. In like manner, the pull-cord 53 passes round pulleys 62 and 63 to a connector 64 also embracing the crank pin 61. The crank pin 61 is carried on a crank 65 at one end of a shaft 66 driven by a motor 67, which is bolted to the base-plate 75. The speed of the motor is such as to rotate the shaft 66 once every 1.5 seconds. On the other end of the shaft 66 is mounted a second crank carrying a crank pin 68 which is connected to the rod 8 which oscillates the arm 7. The angular relation between the crank pin 61 and 68 is such that the chart 29 does not contact the point of the recording pen 24 until the dial pointer has reached a steady position, i. e. until after the drum 1 has been at rest for some time. In the apparatus illustrated in the accompanying drawings the crank pins 61 and 68 subtend an angle of 170° at the axis of the shaft 66. The pull-cords 53 and 56 attached to the crank pin 61 are arranged to lead off from the pin approximately at right angles to each other, so that the chart 29 is not being advanced by the driven reel 40 when it is in contact with the point of the recording pen 24.

The foot 18 of the gauge 76 is adjusted by the micrometer screw 23 until the pointed shows a negative reading equal to the nominal thickness of the film strip to be tested, while the foot 18 rests against the flat 14 of the anvil. If the film strip is now introduced into the measuring gap between the foot 18 and the flat 14, the pointer will register zero when the actual thickness of the film is the same as the nominal thickness, i. e., the arm 25 carrying the recording pen 24 will be vertical. Variations in the thickness of the film strip are registered by movements of the pointer from zero.

The film strip 69 is threaded between the pads carried by the members 27 and 28 of the de-electrifying device 26, and then between the gauge foot 18 and the anvil 13, which are separated by withdrawing the stem of the gauge 76. The leading end of the film 69 is attached to the surface of the drum 1, for instance by affixing a piece of adhesive tape 70 to the film and to the surface of the drum. By using a long piece of tape extending from the drum to the flat 14 of the anvil, the film thickness can be measured from the extreme leading end of the film. If the film is sufficiently short the other end may be similarly attached to the drum. If the film is longer it may be supplied from a spool or may hang loose. So long as the leading end of the film 69 remains attached to the piece of adhesive tape 70, no part of the film will pass through the measuring gap between the foot 18 and the flat 14 more than once, even if the length of the film is greater than the circumference of the drum 1, since once the film has left the measuring gap it will be wound on to the surface of the drum 1 and thus will pass behind the anvil 13 on the side remote from the flat 14. When the film is stiff and springy the adjustable spring 19 can be brought to bear on the stem of the gauge by operating the nut 20 so as to ensure that the foot 18 keeps the film 69 pressed against the flat 14 of the anvil.

When the apparatus has been set up, and the film threaded, the motor 67 is started so as to drive the shaft 66. As the shaft 66 rotates, causing the crank pin 68 to rotate about it, the drum 1 is advanced in steps of 1/4" by the arm 7 which is spring-loaded against the motion of the rod 8. At the same time the crank pin 61 rotates about the shaft 66 causing the member 34 and the arm 49 to oscillate since they are spring-loaded against the tensions in the cords 56 and 53 respectively. Movement of the arm 49 causes the chart 29 to advance by the appropriate amount. With each movement of the drum 1 a fresh part of the film 69 passes into the measuring gap and the thickness of the fresh part is registered on the dial gauge 76. When the dial pointer and pen 24 have reached a steady reading the arm 34 brings the chart momentarily into contact with the point of the recording pen 24 before the drum 1 moves on again. The chart 29 is pressed into contact with the pen 24 by the backing-up plate 35. After the whole length of the film has passed through the apparatus, the motor 67 is stopped and the chart may be wound on and examined.

The apparatus is not limited to the measurement of the thickness of a narrow strip of film; instead, a wide sheet may be used, and its thickness may be measured at several spaced points simultaneously by a series of stationary thickness gauges, spaced along the length of the anvil 13. The invention is applicable to flexible sheet materials generally, and not exclusively to films.

Having described my invention, what I desire to secure by Letters Patent is:

1. Method of measuring and recording variations in thickness of a sheet of flexible material which comprises advancing the sheet intermittently between the movable foot of a stationary thickness gauge and a stationary anvil towards which the foot is urged, the gauge and anvil being secured rigidly in relation to each other, recording the variations in the displacement of the foot from the anvil on a strip of recording material and advancing the strip of recording material with a motion related to the motion of the sheet, the intervals between successive movements of the sheet being sufficient to allow the gauge to steady before the sheet is advanced again.

2. Apparatus for measuring and recording the variations in thickness of a flexible film or other sheet material, said apparatus comprising a stationary thickness gauge having a movable foot, a stationary anvil towards which the foot is urged, the gauge and anvil being secured rigidly in relation to each other, advancing mechanism for intermittently forwarding the flexible film between the foot and the anvil, advancing mechanism for forwarding a strip of recording material, means for recording variations in the displacement of the foot from the anvil on the recording material, the advancing mechanisms being geared to one another so that the motion of the flexible film and the motion of the strip of recording material are related, and means for driving said advancing mechanisms at such a speed that the interval between successive movements of the strip allows the gauge to steady before the next movement.

3. Method of measuring and recording variations in thickness of a sheet of flexible material which comprises advancing the sheet intermittently between the movable foot of a stationary thickness gauge and a stationary anvil towards which the foot is urged, the gauge and anvil being secured rigidly in relation to each other, intermittently recording the variations in the displacement of the foot from the anvil on a strip of recording material and advancing the strip of recording material intermittently with a motion related to the motion of the sheet, the intervals between successive movements of the sheet being sufficient to allow the gauge to steady before the sheet is advanced again, and the recording being effected only while the sheet is at rest and has been at rest long enough for the thickness gauge to take up a steady reading.

4. Apparatus for measuring and recording the variations in thickness of a flexible film or other sheet material, said apparatus comprising a stationary thickness gauge having a movable foot, a stationary anvil towards which the foot is urged, the gauge and anvil being secured rigidly in relation to each other, advancing mechanism for intermittently forwarding the flexible film between the foot and the anvil, advancing mechanism for intermittently forwarding a strip of recording material, means for intermittently recording variations in the displacement of the foot from the anvil on the recording material, the advancing mechanisms being geared to one another so that the motion of the flexible film and the motion of the strip of recording material are related, means for driving said advancing mechanisms at such a speed that the interval between successive movements of the strip allows the gauge to steady before the next movement, and means for bringing the recording means into operation only when the film is at rest and has been at rest long enough for the thickness gauge to take up a steady reading.

5. Method of measuring and recording variations in thickness of a sheet of flexible material which comprises advancing the sheet intermittently between the movable foot of a stationary thickness gauge and a stationary anvil towards which the foot is urged, the gauge and anvil being secured rigidly in relation to each other, intermittently recording the variations in the displacement of the foot from the anvil on a strip of recording material and advancing the strip of recording material intermittently with a motion related to the motion of the sheet, the intervals between successive movements of the sheet being sufficient to allow the gauge to steady before the sheet is advanced again, and the recording being effected by moving said strip into contact with a pen only while the sheet is at rest and has been at rest long enough for the thickness gauge to take up a steady reading.

6. Method of measuring and recording variations in thickness of a sheet of flexible material which comprises advancing the sheet intermittently between the movable foot of a stationary thickness gauge and a stationary anvil towards which the foot is urged, removing dust from the portion of the sheet which is about to enter between the foot and the anvil, the gauge and anvil being secured rigidly in relation to each other, intermittently recording the variations in the displacement of the foot from the anvil on a strip of recording material and advancing the strip of recording material intermittently with a motion related to the motion of the sheet, the intervals beween successive movements of the sheet being sufficient to allow the gauge to steady before the sheet is advanced again, and the recording being effected only while the sheet is at rest and has been at rest long enough for the thickness gauge to take up a steady reading.

7. Method of measuring and recording variations in thickness of a sheet of flexible material which comprises advancing the sheet intermittently between the movable foot of a stationary thickness gauge and a stationary anvil towards which the foot is urged, removing static electricity from the portion of the sheet which is about to enter between the foot and the anvil, the gauge and anvil being secured rigidly in relation to each other, intermittently recording the variations in the displacement of the foot from the anvil on a strip of recording material and advancing the strip of recording material intermittently with a motion related to the motion of the sheet, the intervals between successive movements of the sheet being sufficient to allow the gauge to steady before the sheet is advanced again, and the recording being effected only while the sheet is at rest and has been at rest long enough for the thickness gauge to take up a steady reading.

8. Method of measuring and recording variations in thickness of a sheet of flexible material which comprises advancing the sheet intermittently between the movable foot of a stationary thickness gauge and a stationary anvil towards which the foot is urged, removing dust and static electricity from the portion of the sheet which is about to enter between the foot and the anvil, the gauge and anvil being secured rigidly in relation to each other, intermittently recording the variations in the displacement of the foot from the anvil on a strip of recording material and advancing the strip of recording material intermittently with a motion related to the motion of the sheet, the intervals between successive movements of the sheet being sufficient to allow the gauge to steady before the sheet is advanced again, and the recording being effected by moving said strip into contact with a pen only while the sheet is at rest and has been at rest long enough for the thickness gauge to take up a steady reading.

9. Apparatus for measuring and recording the variations in thickness of a flexible film, said apparatus comprising a stationary thickness gauge having a movable foot, a stationary anvil having a curved surface over which the film is drawn, said curved surface having a flat portion towards which the foot is urged, the gauge and anvil being secured rigidly in relation to each other, advancing mechanism for intermittently forwarding the film between the foot and the anvil with an interval after each movement sufficient to allow the foot to come to rest before the next movement, a recording pen adapted to be moved by and in proportion to movement of said foot, means geared to the advancing mechanism for the film for intermittently advancing a strip of recording paper past but out of contact with said pen, and means for intermittently bringing the paper into contact with the pen only during the intervals at which the film and the foot are at rest.

10. Apparatus for measuring and recording the variations in thickness of a flexible film, said apparatus comprising a stationary thickness gauge having a movable foot, a stationary anvil having a curved surface over which the film is drawn, said curved surface having a flat portion towards which the foot is urged, the gauge and anvil being secured rigidly in relation to each other, ratchet advancing mechanism for intermittently forwarding the film between the foot and the anvil with an interval after each movement sufficient to allow the foot to come to rest before the next movement, a recording pen adapted to be moved by and in proportion to movement of said foot, means geared to the advancing mechanism for the film for intermittently advancing a strip of recording paper past but out of contact with said pen, and means for intermittently bringing the paper into contact with the pen only during the intervals at which the film and the foot are at rest.

11. Apparatus according to claim 9 comprising means for removing dust and static electricity from the film immediately before it is drawn between the foot and anvil of the thickness gauge.

References Cited in the file of this patent

UNITED STATES PATENTS

| | | |
|---|---|---|
| 549,444 | Dailey | Nov. 5, 1895 |
| 667,665 | Beckh | Feb. 12, 1901 |
| 1,446,300 | Lawrence et al. | Feb. 20, 1923 |
| 1,531,357 | Tautz | Mar. 31, 1925 |
| 1,879,465 | Phinney | Sept. 27, 1932 |
| 1,941,597 | Cavagnaro | Jan. 2, 1934 |
| 2,280,613 | Arey | Apr. 21, 1942 |
| 2,706,672 | Cooley | Apr. 19, 1955 |